US011195099B2

(12) United States Patent
Luo et al.

(10) Patent No.: US 11,195,099 B2
(45) Date of Patent: Dec. 7, 2021

(54) DETECTING CONTENT ITEMS IN VIOLATION OF AN ONLINE SYSTEM POLICY USING SEMANTIC VECTORS

(71) Applicant: Facebook, Inc., Menlo Park, CA (US)

(72) Inventors: Enming Luo, Fremont, CA (US); Yang Mu, Fremont, CA (US); Emanuel Alexandre Strauss, San Mateo, CA (US); Taiyuan Zhang, Fremont, CA (US); Daniel Olmedilla de la Calle, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 1074 days.

(21) Appl. No.: 15/694,321

(22) Filed: Sep. 1, 2017

(65) Prior Publication Data

US 2019/0073592 A1    Mar. 7, 2019

(51) Int. Cl.
*G06N 3/08*       (2006.01)
*G06N 3/04*       (2006.01)
*G06F 21/62*      (2013.01)
*G06Q 10/06*      (2012.01)
*G06Q 50/00*      (2012.01)
*G06Q 30/00*      (2012.01)

(52) U.S. Cl.
CPC ......... *G06N 3/088* (2013.01); *G06F 21/6218* (2013.01); *G06N 3/0427* (2013.01); *G06N 3/0454* (2013.01); *G06N 3/084* (2013.01); *G06Q 10/0637* (2013.01); *G06Q 30/018* (2013.01); *G06Q 50/01* (2013.01)

(58) Field of Classification Search
CPC ............................ G06N 3/088; G06F 21/6218
See application file for complete search history.

(56) References Cited

U.S. PATENT DOCUMENTS

| | | | |
|---|---|---|---|
| 6,189,002 B1 | 2/2001 | Roitblat | |
| 7,177,922 B1 | 2/2007 | Carter et al. | |
| 2009/0012965 A1* | 1/2009 | Franken | G06Q 10/10 |
| 2011/0029464 A1 | 2/2011 | Zhang et al. | |
| 2011/0282858 A1 | 11/2011 | Karidi et al. | |
| 2012/0221319 A1 | 8/2012 | Trese | |

(Continued)

OTHER PUBLICATIONS

Goyal et al, Learning Influence Probabilities In Social Networks, 2010, ACM, WSDM'10 (Year: 2010).*

(Continued)

*Primary Examiner* — Kevin W Figueroa
(74) *Attorney, Agent, or Firm* — Fenwick & West LLP

(57) ABSTRACT

A content review system for an online system automatically determines if received content items to be displayed to users violate any policies of the online system. The content review system generates a semantic vector representing the semantic features of a content item, for example, using a neural network. By comparing the semantic vector for the content item with semantic vectors of content items previously determined to violate one or more policies, the content review system determines whether the content item also violates one or more policies. The content review system may also maintain templates corresponding to portions of semantic vectors shared by multiple content items. An analysis of historical content items that conform to the template is performed to determine a probability that received content items that conform to the template violate a policy.

22 Claims, 10 Drawing Sheets

(56) References Cited

U.S. PATENT DOCUMENTS

| | | |
|---|---|---|
| 2013/0041652 A1 | 2/2013 | Zuev et al. |
| 2015/0199333 A1 | 7/2015 | Nekhay |
| 2015/0278200 A1 | 10/2015 | He et al. |
| 2015/0363688 A1 | 12/2015 | Gao et al. |
| 2016/0147736 A1 | 5/2016 | Danielyan |
| 2016/0275058 A1 | 9/2016 | Starostin et al. |
| 2016/0323281 A1* | 11/2016 | Griesmeyer ........... G06N 20/00 |
| 2017/0083508 A1 | 3/2017 | Dixon et al. |
| 2017/0177712 A1 | 6/2017 | Kopru et al. |
| 2018/0174579 A1 | 6/2018 | Henry |
| 2018/0293978 A1* | 10/2018 | Sinha .................... G06N 7/005 |
| 2018/0375896 A1* | 12/2018 | Wang ................. H04L 63/1416 |

OTHER PUBLICATIONS

Norouzi, Fleet et al, Hamming Distance Metric Learning, 2012, NIPS (Year: 2012).*

Norouzi, M. et al., "Fast Searching in Hamming Space with Multi-Index Hashing," Proceedings of the 2012 IEEE Conference on Computer Vision and Pattern Recognition (CVPR), Jul. 26, 2012, pp. 3108-3115.

Raghavendra, R. et al. "Robust Scheme for Iris Presentation Attack Detection Using Multiscale Binarized Statistical Image Features." IEEE Transactions on Information Forensics and Security, vol. 10, No. 4, Apr. 2015, pp. 703-715.

United States Office Action, U.S. Appl. No. 15/694,339, dated Aug. 21, 2020, 14 pages.

* cited by examiner

FIG. 3

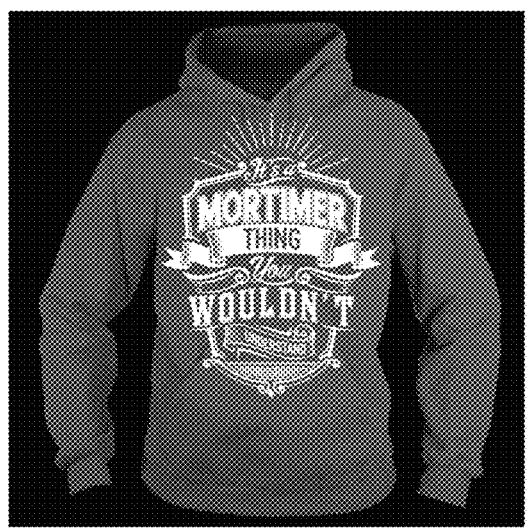
902
904
918
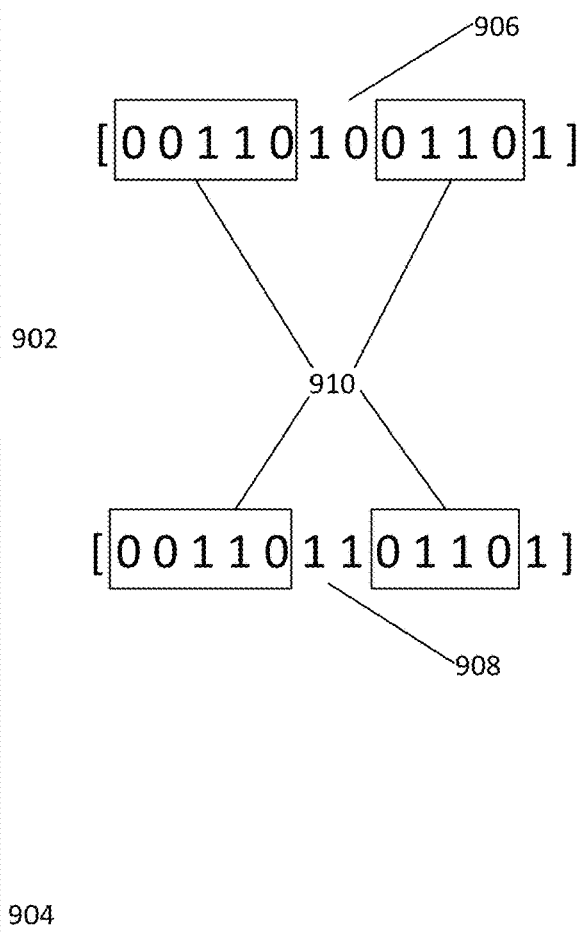
FIG. 9

DETECTING CONTENT ITEMS IN VIOLATION OF AN ONLINE SYSTEM POLICY USING SEMANTIC VECTORS

BACKGROUND

This invention generally relates to the analysis of content items provided by online systems to users, and in particular to semantic analysis and classification of content items provided by an online system based on machine learning, for example, using neural networks.

In many online systems, such as social networking systems, users are able to connect to and communicate with other users of the online system. For example, an online system may allow for users to share content with other users of the online system by providing content items to the online system for presentation to the other users. In addition, content publishers may be able to submit content items to the online system for presentation to users of the online system. The content items may comprise text data, image data, audio data, video data, and/or any other type of content that may be communicated to a user of the online system.

To ensure a high quality user experience, an online system may remove or prevent certain types of content items from being displayed to users. The types of content items that can be displayed to users of the online system may be restricted by one or more policies. For example, a particular online system may have a policy that disallows display of content items that depict certain types of content (e.g., blood and gore, nudity, drug use, and/or the like).

The online system may maintain a review process to identify instances of content items that violate one or more policies, and are thus unsuitable for display to users. For example, human reviewers may manually review received content items in order to determine their suitability for display. An online system may receive a large number of content items to be reviewed, for example, hundreds of thousands of content items in a few days or a week. Use of humans for reviewing content items is a slow and expensive process. Existing automatic techniques, for example, searching for offensive keywords are often unable to identify several complex policy violations. Therefore, conventional techniques for identifying content items that violate policies of the online system are either ineffective, expensive, or time-consuming.

SUMMARY

Embodiments perform semantic analysis of content items for determining if the content items violate policies of an online system. A policy specifies attributes of content items that are suitable for presenting to users. For example, a policy may specify that content items including profanity are not suitable for presenting to users. The online system receives a request to determine whether an input content item violates any policy of the online system. The online system determines a semantic vector representation of the input content item, for example, based on hidden embeddings obtained from a convolutional neural network. For each policy, the online system stores a set of semantic vectors of content items determined to violate the policy. The online system determines a distance metric value between the semantic vector of the input content item and semantic vectors of a set of semantic vectors corresponding to a policy. If the distance metric value is below a threshold value, the online system determines that the input content item is likely to violate that policy. Accordingly, the online system may withhold the content item from users of the online system.

In an embodiment, the semantic vector representation of a content item is obtained from a neural network, for example, a convolutional neural network. The neural network may output one or more scores indicating a probability that the input content item contains one or more corresponding semantic features. In addition, a hash function may be applied to hidden embeddings obtained from a neural network to determine the semantic vector.

Because content items that are semantically similar can be expected to violate the same policies, the online system determines whether the received content item violates the policy by comparing the semantic vector of a received content item to those of content items previously determined to violate the policy. In some embodiments, if the content item is determined to violate the policy, its semantic vector is added to the set of semantic vectors corresponding to the policy. In some embodiments, the content item is determined to violate the policy if its semantic vector is within a first threshold distance of a semantic vector of the set of semantic vectors corresponding to the policy. In some embodiments, if the distance between the semantic vector of the content item and the closest semantic vector of the set of semantic vector is between a first threshold value and a second threshold value, the content item may be submitted for review by an agent.

In some embodiments, the online system generates one or more semantic vector templates corresponding to common portions of multiple semantic vectors. Content items that conform to a particular semantic vector template are analyzed to determine whether or not the template is associated with content items that are acceptable or unacceptable under a particular policy. The online system may determine whether a received content item is acceptable or unacceptable under one or more policies, based upon the semantic vector templates that the content item conforms to.

BRIEF DESCRIPTION OF THE DRAWINGS

FIG. 3 illustrates two different content items that may be considered variations of each other.

FIG. 9 illustrates an example of a semantic vector template in accordance with some embodiments.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overall System Environment

Figure 1:
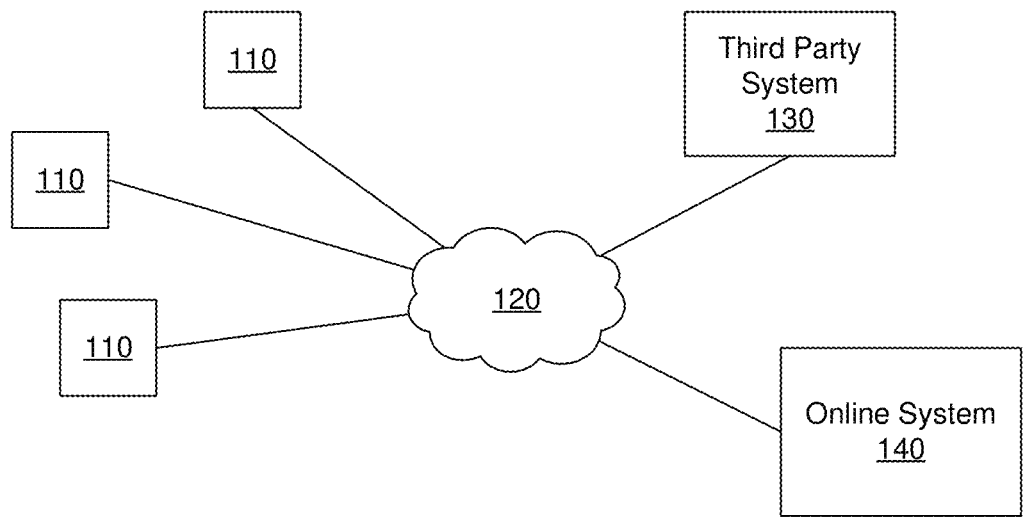
FIG. 1 is a block diagram of a system environment for an online system.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100. For example, the online system 140 may be a social networking system, a content sharing network, or another system providing content to users.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone, or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or. ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, or information about an application provided by the third party system 130.

Figure 2:
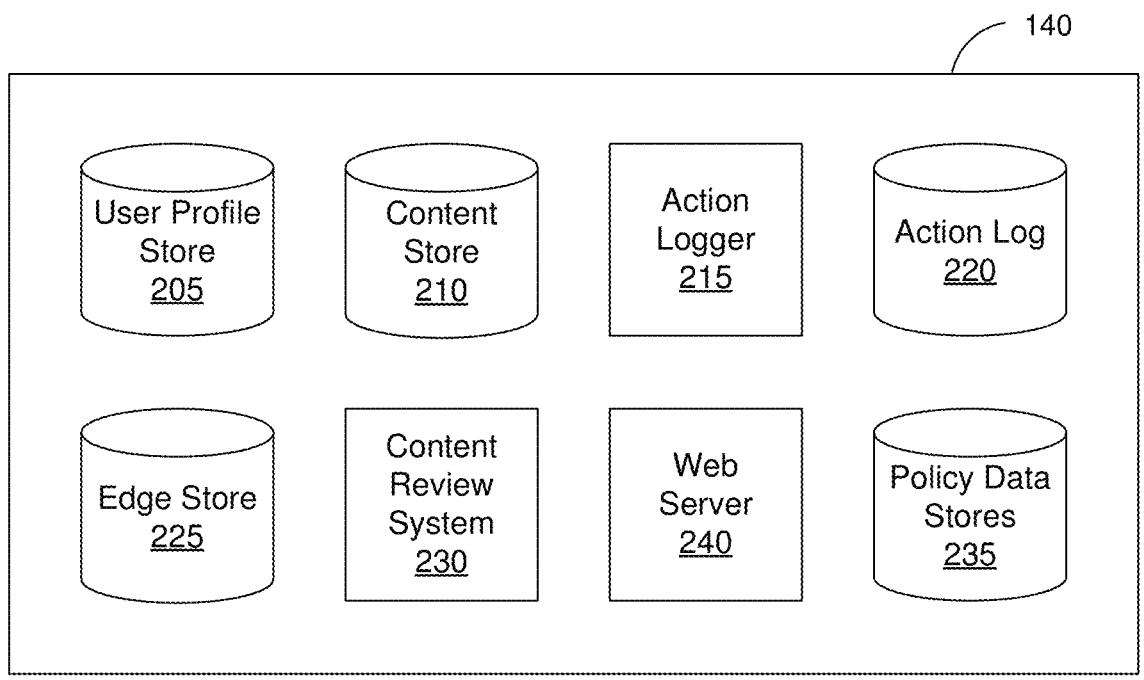
FIG. 2 is a block diagram of an architecture of the online system.

FIG. 2 is a block diagram of an architecture of the online system 140. The online system 140 shown in FIG. 2 includes a user profile store 205, a content store 210, an action logger 215, an action log 220, an edge store 225, a content review system 230, a policy data store 235, and a web server 240. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 may be associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image, with information identifying the images in which a user is tagged stored in the user profile of the user. A user profile in the user profile store 205 may also maintain references to actions by the corresponding user performed on content items in the content store 210 and stored in the action log 220.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or "content items.". Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, and attending an event posted by another user. In addition, a number of actions may involve an object and one or more particular users, so these actions are associated with the particular users as well and stored in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140 Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Additionally, actions a user performs via an application associated with a third party system 130 and executing on a client device 110 may be communicated to the action logger 215 by the application for recordation and association with the user in the action log 220.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140. Each user or object can be represented as a node in the social network and the nodes are connected to each other via edges. In one embodiment, the nodes and edges form a complex social network of connections indicating how users and/or objects are related or connected to each other (e.g., one user accepted a friend request from another user to become connections in the social network) and how a user is connected to an object due to the user interacting with the object in some manner (e.g., "liking" a page object, joining an event object or a group object, etc.). Objects can also be connected to each other based on the objects being related or having some interaction between them.

An edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

The content review system 230 is configured to review content items (e.g., content stored in the content store 210) intended for display to users of the online system 140. The online system 140 may have one or more policies restricting the types of content items that may be displayed (e.g., stored in the policy data store 235). Each policy may correspond to a type of restricted content, such as sexual content, violent content, racist content, illegal content, and/or the like, wherein content items depicting restricted content are deemed unsuitable for display to users of the online system 140. In some embodiments, a policy may apply to only a subset of the users of the online system 140 (e.g., a particular policy may restrict certain content from being displayed to users below a threshold age, while the content may be displayed to users above the threshold age).

In some embodiments, the online system 140 comprises policy data stores 235 that store information associated with one or more policies. As discussed above, the online system 140 may have one or more policies restricting the types of content items that may be displayed. The policy data stores 235 may store a policy object corresponding to each policy. The policy object for a policy may specify various attributes of the policy such as policy name/identifier, types of content that the policy applies to, attributes of users to which the policy applies, etc. In some embodiments, a policy object stores one or more rules specifying types of content items that conform to the policy and/or violate the policy.

In addition, the policy data stores 235 may store information associated with content items that have violated one or more policies. For example, content items that have been previously determined to violate a particular policy may be used to identify other content items that also violate the particular policy. In some embodiments, each policy is associated with a corresponding data store indicating content items that have been determined to violate the policy. In some embodiments, the content items associated which each policy (e.g., content items determined to violate the policy) may be stored in separate databases (e.g., such that each policy is associated with a separate database), in separate tables or sets of tables of one or more databases, in separate portions of the same table (e.g., identified using a policy ID or other parameter), and/or the like.

The policy data stores 235 may store the actual content items, or representations of the content items (e.g., a semantic vector corresponding to the content item, discussed in greater detail below). The content review system 230 may use policy data stores 235 to analyze received content items to determine the suitability of the content items for display. For example, the content review system 230 may compare a received content item with the data of the policy data stores 235 to determine how similar the content item is to previous content items found violating one or more policies, and to determine whether to allow the content item based upon the determination.

The web server 240 links the online system 140 via the network 120 to the one or more client devices 110, as well as to the one or more third party systems 130. The web server 240 serves web pages, as well as other content, such as JAVA®, FLASH®, XML and so forth. The web server 240 may receive and route messages between the online system 140 and the client device 110, for example, instant messages, queued messages (e.g., email), text messages, short message service (SMS) messages, or messages sent using any other suitable messaging technique. A user may send a request to the web server 240 to upload information (e.g., images or videos) that are stored in the content store 210. Additionally, the web server 240 may provide application programming interface (API) functionality to send data directly to native client device operating systems, such as IOS®, ANDROID™, or BlackberryOS.

Displaying Content Items. And Content Item Policies

An online system (e.g., online system 140) may receive content items from various sources, such as from users of the online system (e.g., users of the client devices 110) or from third party systems (e.g., third party system 130). The received content items may be displayed to users of the online system (e.g., through client devices 110). For example, if the online system corresponds to a social network, the content item may correspond to a piece of content shared by a first user to one or more additional users, a sponsored content item, for example, an advertisement to be displayed to one or more users, and/or the like. While the specification primarily discusses content items that correspond to images, it is understood that content items may be associated with any type of content, such as text, image content, audio content, video content, or any combination thereof.

As discussed above, the online system may restrict the types of content items that can be received by users of the online system, based upon one or more policies. Each policy may specify a different type of content that is disallowed for display to one or more users of the online system. For example, the online system may have a first policy that disallows content items that contain graphic depictions of blood or gore to be displayed to users, and a second policy that disallows content items that are pornographic in nature. In some embodiments, a policy may be applied to only a subset of users of the online system (e.g., content items that violate the policy cannot be displayed to users within the subset, but may be displayed to users outside the subset). A subset of users is characterized by sets of user profile attribute values or ranges of user profile attribute values. For example, a set of user may comprise users of a particular gender having age within a particular range of values.

In some embodiments, the online system receives content items from various content creators, and automatically analyzes the received content items to determine whether or not the content items are likely to violate any of one or more policies. A content creator may also be referred to as a content provider or a content provider system. If the online system determines that a content item is likely to violate a particular policy, then the online system prevents the content item from being displayed to users of the online system. In some embodiments, the online system determines whether the content item is likely to violate a policy by comparing a representation of the content item with representations of one or more content items that have previously been determined to violate the policy In some embodiments, content creators of policy-violating content items may create different variations of content items having superficial differences, but which contain identical or similar types of content. For example, different variations of content items may have different resolutions, different levels of cropping, different text or logos, different placement of text or logos, different objects displayed in the background of an image, and/or the like FIG. 3 illustrates two different content items 302 and 304 that may be considered variations of each other. As illustrated in FIG. 3, the first content item 302 and the second content item 304 are similar, but contain banners of different colors and different text. As such, if the first content item 302 is determined to have a high likelihood of violating a particular policy of the online system, it is highly likely that the second content item 304 also violates the policy.

In some embodiments, a simple image comparison may not be sufficient to identify content items that are variations of each other. For example, as illustrated in FIG. 3, the first and second content items 302 and 304 contain large areas that are different colors from each other. In other cases, another variation of the first and second content items may have a text banner in a different location, the image of the person shifted in location or distorted, or contain other variations. As such, content item variations, while containing similar content, can potentially vary significantly in appearances.

In some embodiments, the online system performs semantic analysis of the content items to determine similar features of different content items. Each content item contains semantic features that indicate what types of objects are depicted in the content item, relative positions of the depicted objects, and/or the like. By extracting the semantic features of different content items, the content items can be compared with each other to determine a level of similarity between the semantic content of content items, which may ignore non-substantive variations between the content items (such as resolution levels, cropping levels, and/or the like).

Figure 4:
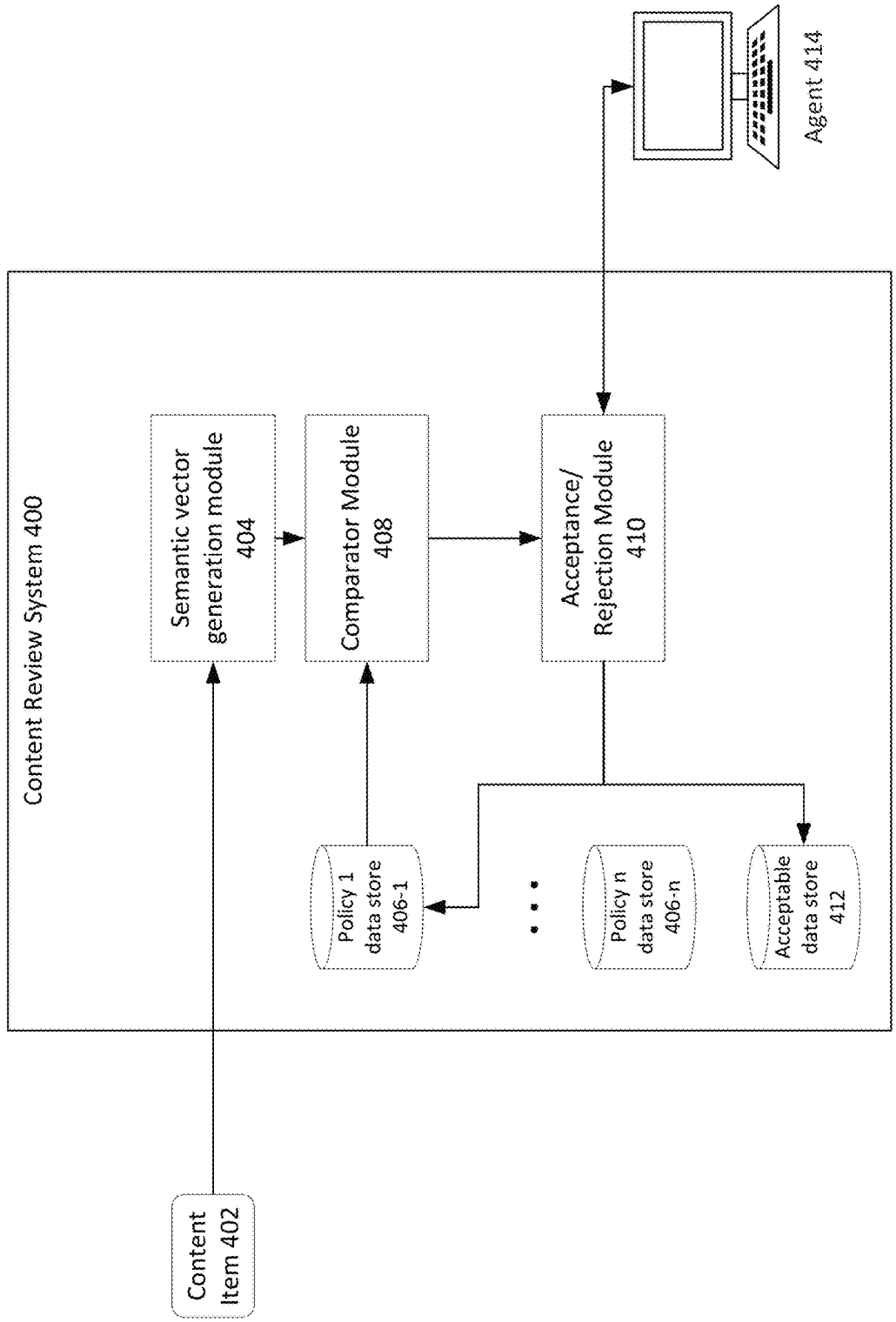
FIG. 4 illustrates a block diagram of a content review system, in accordance with some embodiments.

FIG. 4 illustrates a block diagram of a content review system, in accordance with some embodiments. The content review system 400 illustrated in FIG. 4 may correspond to the content review system 230 illustrated in FIG. 2. The content review system 400 is configured to receive a content item 402, and to determine whether the content item 402 is suitable for display to the users of the online system, or whether the content item 402 likely violates any policies of the online system that would render the content item 402 unsuitable for display to the users. In some embodiments, the content item 402 is received from a content creator (e.g., a user of the online system, a user of a third party system, such as an advertiser, and/or the like). In some embodiments, the content item 402 may comprise a captured image or screenshot of a content item displayed on a landing page (e.g., of the online system or a third party application). For example, the content review system 400 may receive an image that is a screenshot of a content item corresponding to an advertisement being displayed on a landing page in order to review the content item.

The content review system 400 comprises a semantic vector generation module 404 that generates a semantic vector corresponding to the received content item 402 that indicates semantic features extracted from the content item 402. Semantic features that may be represented in the semantic vector of the content item 402 may include text displayed within the content item and/or visual properties of the content item (e.g., visual elements depicted in the content item, objects depicted in the content item). For example, the content review system 400 may use an object recognition algorithm to identify various objects depicted within the content item 402, such as a face, a body, an animal, a logo, an article of clothing, an environmental object, and/or the like. Content items having similar semantic features will have similar corresponding semantic vectors. As such, different semantic vectors corresponding to different content items can be compared in order to order to determine a level of similarity between the content items.

In some embodiments, the semantic vector generation module 404 comprises a convolutional neural network configured to receive the content item 402 and extract one or more semantic features of the received content item 402. In some embodiments, the neural network outputs a plurality of semantic features each corresponding to a probability score indicating a likelihood that the respective semantic feature is actually included in the content item 402. For example, where the content item 402 comprises an image of an animal, the neural network may output a first semantic feature "cat" with a probability score of 0.9 and a second semantic feature "dog" with a probability score of 0.1, indicating a 90% probability that the animal depicted in the content item 402 is a cat, and a 10% probability that the depicted animal is a dog. In some embodiments, the neural network may extract multiple semantic features corresponding to multiple objects depicted in the received content item 402. For example, a particular content item 402 may contain the semantic elements "man," "couch," and "coffee table," indicating different objects depicted in the content item 402.

Figure 5:
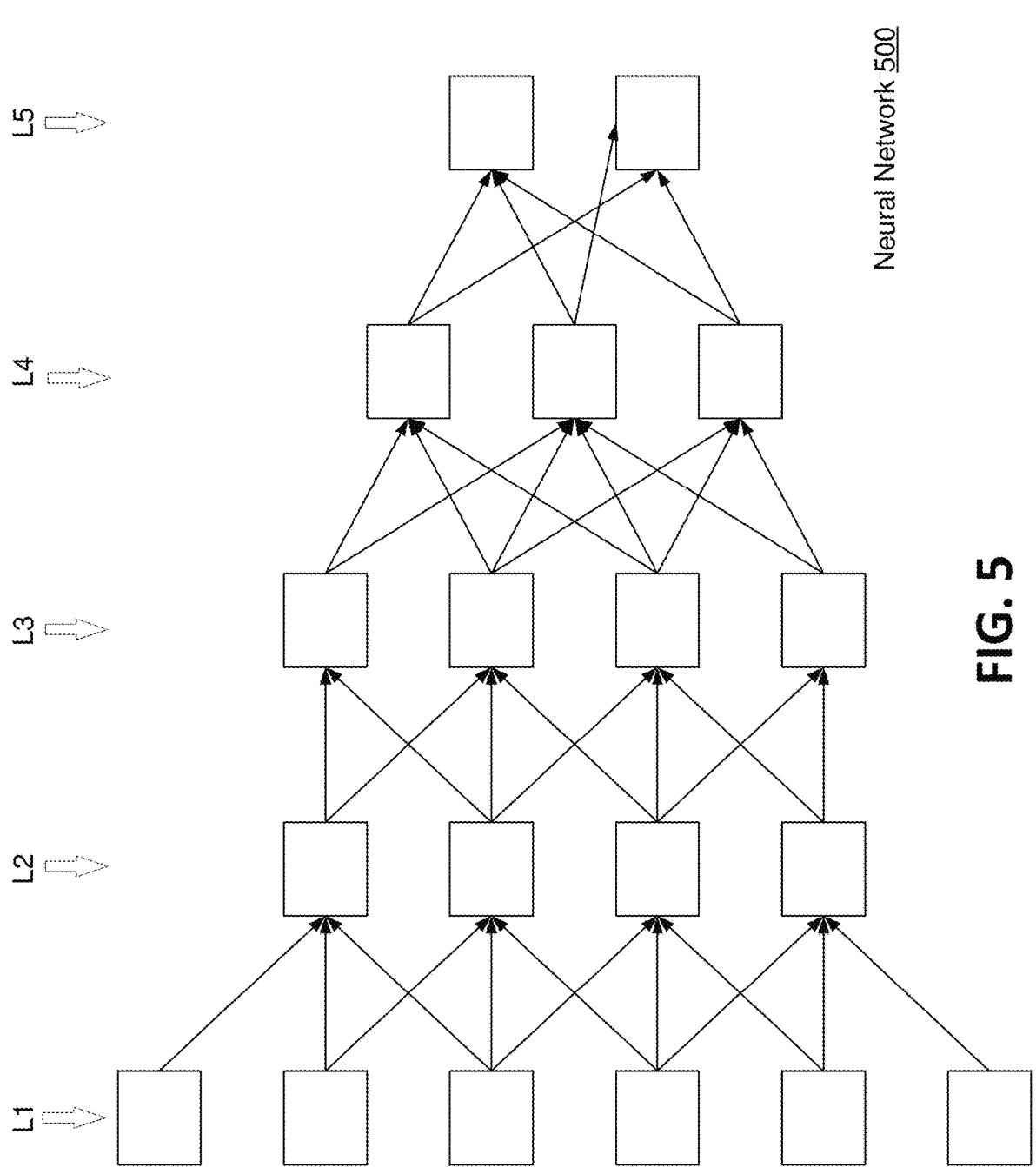
FIG. 5 illustrates an example neural network that may be used to generate a semantic vector for a received content item, in accordance with some embodiments.

FIG. 5 illustrates an example neural network that may be used to generate a semantic vector for a received content item, in accordance with some embodiments. The neural network 500 comprises a plurality of layers (e.g., layers L1 through L5), each of the layers comprising one or more nodes. Each node has an input and an output, and is associated with a set of instructions corresponding to the computation performed by the node. The set of instructions corresponding to the nodes of the neural network may be executed by one or more computer processors. The neural network 500 may also be referred to as a deep neural network.

Each connection between the nodes (e.g., network characteristics) may be represented by a weight (e.g., numerical parameter determined in a training/learning process). In some embodiments, the connection between two nodes is a network characteristic. The weight of the connection may represent the strength of the connection. In some embodiments, a node of one level may only connect to one or more nodes in an adjacent hierarchy grouping level. In some embodiments, network characteristics include the weights of the connection between nodes of the neural network. The network characteristics may be any values or parameters associated with connections of nodes of the neural network.

The first layer of the neural network 500 (e.g., layer L1) may be referred to as the input layer, while the last layer (e.g., layer L5) is referred to the output layer. The remaining layers between the input and output layers (e.g., layers L2, L3, L4) are hidden layers. Accordingly nodes of the input layer are input nodes, nodes of the output layer are output nodes, and nodes of the hidden layers are hidden nodes. Nodes of a layer may provide input to another layer and may receive input from another layer. For example, nodes of each hidden layer are associated with two layers (a previous layer and a next layer). The hidden layer receives the output of the previous layer as input and provides the output generated by the hidden layer as input to the next layer. For example, nodes of hidden layer L3 receive input from the previous layer L2 and provide input to the next layer L4.

The neural network 500 is configured to determine semantic features of received content items. The layers of the neural network 500 are configured to identify features within the received content item. In some embodiments, early layers of the neural network 500 (e.g., layers closer to the input layer) may be convolutional layers configured to perform low level image processing such as edge detection, etc. Later layers of the neural network 500 (e.g., layers closer to the output layer) may be configured to performing higher level processing such as object recognition, etc. In some embodiments, the layers of the neural network 500 perform recognition of objects in different scales using max pooling between scales, recognitions of objects in different orientations using Gabor filtering, recognition of objects with variances in location using max pooling between neighboring pixels, and/or the like.

In some embodiments, the last hidden layer of the neural network 500 (e.g., the last layer before the output layer, illustrated in FIG. 5 as layer L4) may be configured to determine the semantic features of the content item. The output layer of the neural network 500 outputs one or more scores that indicate a probability that the received content item contains the determined semantic features.

The last hidden layer of the neural network 500 may output a vector representation of the semantic features of the received content item, referred to as an embedding. In some embodiments, the neural network 500 applies a hash function to the determined semantic features to generate a semantic vector. As such, the content item can be represented using as a hash value generated by applying a hash function to the embedding obtained from the hidden layer of a neural network processing the content item. In some embodiments, the hash function preserves distances between the semantic features of different content items in an original distance space by minimizing quantization loss.

The hash value representing the content item 402 may be expressed as a 256 bit vector that encodes the semantic vector representation of features extracted as embeddings from the neural network. In some embodiments, the hash value corresponding to the content item 402 is represented as a binary vector. Certain semantic features of the content item 402 may map to substrings of the binary vector. A substring may represent consecutive bits of the binary vector or bits in various positions within the binary vector.

In some embodiments, the network characteristics of the neural network (e.g., weights between nodes) may be updated using machine learning techniques. For example, the neural network 500 may be provided with a training set comprising known input content items. The determined semantic features of the content items may be compared to the actual expected semantic features associated with each of the content items, whereupon the comparison is used to update the network characteristics of the neural network. In some embodiments, the network characteristics of the neural network are learned by optimizing a loss function using backpropogation.

The semantic vector generation module 404 may generate the semantic vector such that semantic features that are similar to each other will map to strings with small distances between them, while semantic features that are dissimilar are mapped to strings with larger distances between them. As used herein, the term "distance" may correspond to any type of measurement that indicates a degree of similarity between two vectors. For example, in some embodiments, wherein the semantic vector is expressed as a hash value, distance between different vectors may correspond to a Euclidean distance. On the other hand, in embodiments where the vectors are expressed as binary vectors, a distance between the vectors may correspond to a Hamming distance.

Figure 6:
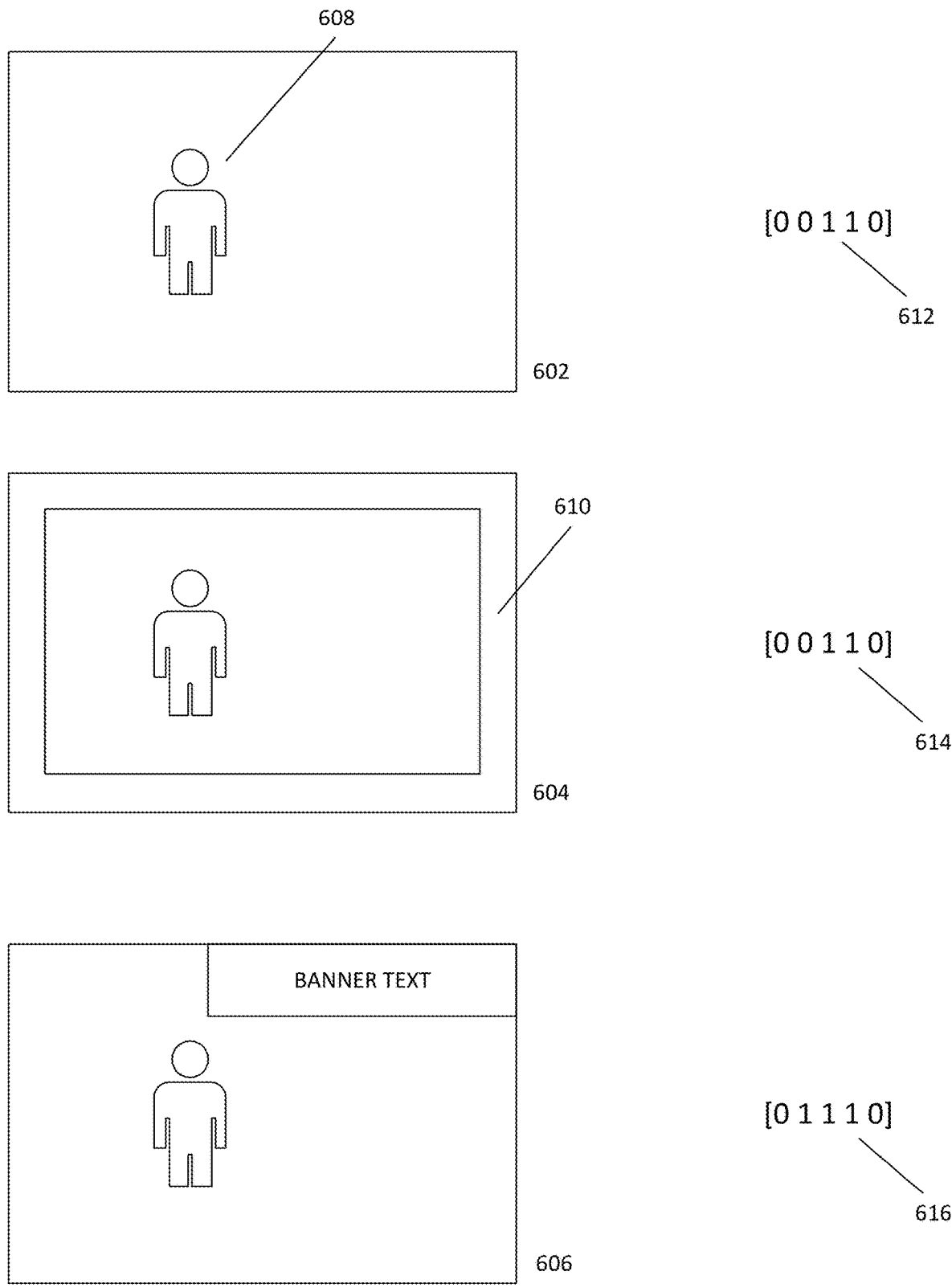
FIG. 6 illustrates examples of different content items that have the same or similar semantic vectors, in accordance with some embodiments.

In some embodiments, it may be possible for a particular semantic vector to correspond to different content items. This may occur if there are only minor differences between the semantic features of the different content items FIG. 6 illustrates examples of different content items that have the same or similar semantic vectors, in accordance with some embodiments. As illustrated in FIG. 6, a first content item 602 depicts a person 608. The first content item 602 may be represented by the first binary vector 612. A second content item 604 also depicts a person in a substantially similar position as the person 608 depicted in the first content item 602. However, the second content item 604 may contain slight differences in comparison to the first content item 602, such as having a border 610 with a greater thickness or a different color. However, because the semantic vector of the respective content items is based upon the semantic features of the content items, and less on particular visual representation such as image resolution or colors used, the second content item 604 may still be semantically similar enough to the first content item 602 such that the second content item 604 may be represented using a second binary vector 614 that is the same as the first binary vector 612.

On the other hand, the third content item 606 may contain sufficient differences from the first and second content items 602 and 604 (e.g., a banner area containing text), that the semantic vector of the third content item 606 will be different from those of the first and second content items 602 and 604. For example, as illustrated in FIG. 6, the third content item 606 is represented by the third binary vector 616 that is different from the first and second binary vectors 612 and 614. However, the third binary vectors 616 may be similar enough to the first and second binary vectors such that the third content item 606 will be considered as being likely to violate a particular policy if the first and second content items 602 and 604 are also found to violate the policy.

As discussed above, the online system maintains one or more policies restricting the types of content items that can be received by users of the online system. In some embodiments, each policy is associated with a respective data store 406. For example, as illustrated in FIG. 4, the content review system 400 is able to access a plurality of data stores 406-1 to 406-$n$, each corresponding to a respective policy of the online system. Each of the data stores 406-1 to 406-$n$ stores one or more semantic vectors, each stored semantic vector corresponding to one or more content items that have been determined to violate the respective policy associated with the data store. Although FIG. 4 illustrates the semantic vectors associated with each policy being stored in a separate data store, it is understood that in other embodiments, the semantic vectors associated with different policies may be stored within the same data store. For example, semantic vectors associated with a plurality of policies may be stored using different tables within a data store, or within the same table within a data store (wherein a policy ID is used to filter out subsets of semantic vectors corresponding to a particular policy).

The content review system 400 comprises a comparator module 408 which receives the semantic vector of the content item 402 generated by the semantic vector generation module 404, and compares the received semantic vector to one or more stored semantic vectors of one or more of the data stores 406-1 to 406-$n$.

In some embodiments, the comparator module 408 compares the received semantic vector of the content item 402 with the stored semantic vectors of each of the data stores 406-1 through 406-$n$ by determining a distance between the semantic vector of the content item 402 and stored semantic vectors of the respective data store. Where the semantic vector of the content item 302 comprises a hash value of an embedding representing the content item obtained from a hidden layer of a neural network, the determined distance may correspond to a Euclidean distance. Alternatively, where the semantic vector of the content item 402 corresponds to a binary vector, the determined distance may be a Hamming distance. In some embodiments, the comparator module 408 determines a shortest distance between the semantic vector of the content item 402 and any of the semantic vectors of a respective data store.

The content review system 400 comprises an acceptance/rejection module 410 that receives the determined distances from the comparator module 408, and determines whether the content item 402 should be accepted (e.g., allowed to be displayed to the users of the online system) or rejected (e.g., disallowed from being displayed to the users of the online system) based on the received distances. The received distances may correspond to the shortest distance between the semantic vector of the content item 402 and any of the semantic vectors stored by each of the data stores 406-1 through 406-*n* corresponding to policies maintained by the online system In some embodiments, the acceptance/rejection module 410 compares the received distances to one or more threshold values. Each threshold value indicates a distance (between the semantic vector of the received content item 402 and a closest semantic vector stored in a policy data store) at which the likelihood of the content item 402 violating the respective policy exceeds a certain amount. For example, the one or more threshold values may comprise a first threshold value indicating a distance at which the likelihood of the content item 402 violating the policy exceeds 90%, and a second threshold value indicating a distance at which the likelihood of the content item 402 violating the policy exceeds 60%. The acceptance/rejection module 410 determines whether the content 402 should be allowed or disallowed under the respective policy, based upon the comparison of the received distances to the threshold values. For example, if the received distance is greater than a particular threshold value, the acceptance/rejection module 410 may indicate that the content item 402 likely does not violate the policy, and allow the content item 402 to be displayed to users of the online system. On the other hand, if the received distance is less than a particular threshold value, the acceptance/rejection module 410 may indicate that the content item 402 likely violates the policy, and disallows display of the content item 402.

In some embodiments, if the content item 402 is determined to likely violate a particular policy, then the semantic vector of the content item 402 may be added to the data store 406 corresponding to the policy. In some embodiments, if the content item 402 is determined to not violate any of the plurality of policies, the content item 402 (or its corresponding semantic vector) may be stored in an acceptable data store 412, which stores content items (or semantic vectors of content items) determined to be acceptable under the plurality of policies.

In some embodiments, the acceptance/rejection module 410 may base its determination of whether the content item 402 is acceptable or violates a policy based upon agent review. For example, the acceptance/rejection module 410 may submit the content item 402 to an agent 414 for evaluation. In some embodiments, the agent 414 corresponds to a human agent, who may manually indicate whether the content item 402 violates a policy or is acceptable under the plurality of policies. In other embodiments, the agent 414 corresponds to an automated agent, such as an expert system. In some embodiments, the acceptance/rejection module 410 only submits the content item 402 for review by the agent 414 under certain circumstances (e.g., if the received distance between the semantic vector of the content item 402 and the closest semantic vector of the respective data store is between a first threshold and a second threshold value).

Figure 7:
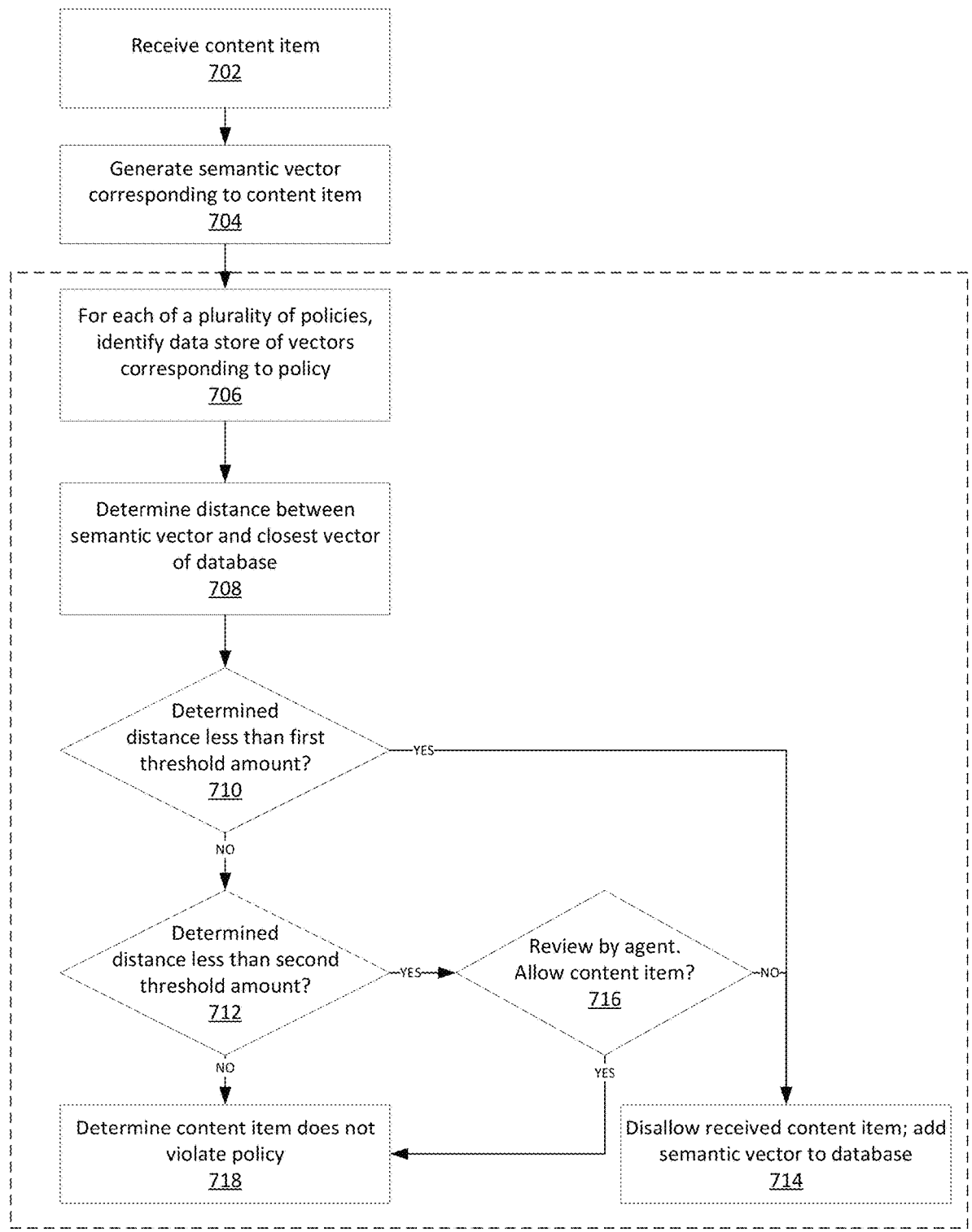
FIG. 7 illustrates a flowchart of a process performed by a content review system of an online system for reviewing received content items, in accordance with some embodiments.

FIG. 7 illustrates a flowchart of a process performed by a content review system of an online system for reviewing received content items, in accordance with some embodiments The content review system receives 702 a content item to be reviewed. The content item may correspond to any type of content, such as an image, text, audio, video, or any combination thereof. In some embodiments, the content item is received from a content creator to be displayed to one or more users of an online system, the content creator corresponding to a user of the online system, a third party system such as an advertiser, and/or the like. In other embodiments, the content item may correspond to a captured image or screenshot of a content item displayed on a landing page.

The content review system generates 704 a semantic vector of the received content item. In some embodiments, the semantic vector comprises an embedding obtained from a hidden layer of a neural network processing the content item. In some embodiments, the semantic vector is a binary vector representing a hash value obtained by applying a hash function to the embedding obtained from a hidden layer of a neural network processing the content item. In addition, the hash value may undergo quantization to generate a binary vector corresponding to the received content item.

The content review systems determines if the received content item likely violates any of the plurality of policies, based upon the generated semantic vector To do so, the content review system, accesses 706 a data store for each of a plurality of policies. Each policy defines a set of rules disallowing certain types of content items for display to users of the online system. Each data store corresponding to a policy stores one or more semantic vectors corresponding to content items that have been previously determined to violate the respective policy (and thus disallowed from being displayed to users).

For each of the accessed data stores, the content review system determines 708 a distance corresponding to a shortest distance between the semantic vector of the content item and any of the semantic vectors stored by the data store. In some embodiments, the content review system determines a distance between the semantic vector of the content item to each of the stored semantic vectors of the data store, and selects a distance corresponding to the shortest distance. The determined distance may be a Euclidean distance (e.g., where the semantic vectors are represented as embeddings) or a Hamming distance (e.g., where the semantic vectors are represented as binary vectors corresponding to hash values obtained from embeddings).

In some embodiments, the content review system determines the distance based upon a similarity search. For example, the content review system may search the data store to identify a subset of the stored semantic vectors that are within a threshold distance of the semantic vector of the content item. The content review system may then compare each semantic vector of the identified subset with the semantic vector of the content item to determine a distance between the respective semantic vector and the semantic vector of the content item, whereupon a shortest distance between the semantic vector of the content item and a semantic vector of the data store can be identified.

In some embodiments, similar stored semantic vectors can be identified using multi-index hashing. The stored semantic vectors are split into multiple segments, and used to build separate multi-indexing tables. Search is performed on each indexing table to returning stored semantic vectors where all segments of the vector are within a threshold distance from a corresponding segment of the semantic vector of the content item. The returned stored semantic vectors are analyzed to determine a shortest distance.

The content review system determines an action to be performed on the received content item based upon the determined shortest distance. For example, the content review system determines 710 if the determined distance is less than a first threshold value. The first threshold value corresponds to a distance at which content items having a semantic vector within the first threshold distance from any stored semantic vector of the data store is considered likely to violate the corresponding policy. In some embodiments, different distance values may be mapped to probabilities that the content item violates the policy, wherein the first threshold value corresponds to a particular probability value (e.g., 90%). As such, if the determined distance is less than the first threshold value, the received content item is considered to be likely violating the policy corresponding to the data store, and is disallowed 714 from being displayed to users of the online system.

On the other hand, if the determined distance is not less than the first threshold, the content review system, determines 712 if the determined distance is less than a second threshold value. The second threshold value may be selected such that content items having a semantic vector having a distance from the closest stored semantic vector of the data store that is between the second threshold distance and the first threshold distance are considered to have a moderate likelihood of violating the policy. As such, if the determined distance is less than the second threshold (but greater than the first threshold), the content review system may submit 716 the content item for manual review by an agent. In some embodiments, the agent corresponds to a human agent. In other embodiments, the content review may be performed by an automatic agent, for example, a process executing on an expert system Else, the content review system determines 718 that the content item does not violate the policy. If the content item is determined to not violate any of the policies of the plurality of policies, then the content item may be allowed to be displayed to users of the online system.

The content review system transmits 716 the received content item to an agent associated with the online system for human review. The content review system may also indicate to the agent the particular policy the content item is considered to have a moderate likelihood of violating. The agent makes a determination as to whether the content item violates the policy associated with the data store. If the agent determines 714 that the content item violates the policy, then the content item may be disallowed from being displayed to users of the online system, and may be added to the data store associated with the violated policy. On the other hand, the agent may determine that the content item does not violate 718 the policy, allowing for the content item to be displayed to the users if it does not violate any other policies of the online system.

In some embodiments, blocks 706 through 718 of the process illustrated in FIG. 7 are performed for each of the plurality of policies associated with the online system, such that the content item is disallowed from being displayed to users of the online system if it is determined likely to violate any one of the plurality of policies, and is allowed to be displayed if it is determined that it likely does not violate any of the plurality of policies. In some embodiments, if the content item is determined to be violate a particular policy, further analysis with regards to other policies may not be required.

In some embodiments, review 716 by the agent may occur only after the semantic vector of the received content item has been compared with the stored semantic vectors of each of the data stores corresponding to the plurality of policies. As such, the agent may review the content item against a plurality of different policies (e.g., each policy where the distance of semantic vector of the content item from the closest semantic vector of the respective data store was between the first and second thresholds for the policy). In other embodiments, where the content item is determined to have a moderate likelihood of violating a plurality of different policies, different agents may review the content item against different policies. In some embodiments, the semantic vector of the content item is added to the corresponding data store of each policy the content item is determined to violate (either through automatic determination or through agent review).

In some embodiments, review by the agent may be skipped if the content item is determined to likely violate any of the plurality of policies (e.g., if the content item has already been determined to likely violate a first policy, either automatically or based upon agent review, then there may be no need for review regarding a second policy).

Although the above process illustrates particular thresholds used for automatically reviewing content items for potential policy violations, it is understood that in other embodiments, different thresholds, or more or less thresholds, may be used. For example, in some embodiments, the policies associated with the online system may be associated with different threshold values (e.g., a first policy may be associated with a first threshold value and a second threshold value different from those of a second policy). In some embodiments, one or more policies may be associated with a first threshold but not a second threshold (e.g., a content item is determined to be likely to violate the policy if the distance between the semantic vector of the content item and the closest stored semantic vector is below the first threshold, or not if above the first threshold, with no review by an agent).

By maintaining a record of semantic vectors for each policy corresponding to content items that have been historically determined to violate the policy, and comparing semantic vectors of newly received content items with those of the historical content items, content items that are semantically similar to policy-violating content items, and thus also likely to violate policy, may be automatically identified. As such, if a content creator creates several variations of a policy-violating content item, the different variations can be automatically detected and prevented from being displayed to users of the online system, without requiring intervention by human agents Reviewing Policy Data Stores for False Positives In some embodiments, the content review system may review the stored semantic vectors corresponding to different policies of the online system to determine whether the semantic vectors stored in each data store actually violate the policy associated with the data store. For example, a semantic vector of a first content item that does not violate the policy may be similar to the semantic vector of a second content item that does violate the policy, and as such may be erroneously stored in the data store corresponding to the policy as a false positive. For example, the second content item may violate a policy for containing blood or gore, while the first content item, despite being semantically similar to the second content item, may contain a strategically placed banner or text box that obscures the blood or gore in the image, and thus would not violate the policy. A false positive stored in a policy data store may also cause other content items that are semantically similar to the false positive and do not actually violate the policy to be determined to violate the policy and stored as additional false positives A review of the data store may indicate that the first content item does not violate the policy, causing the content review system to remove its semantic vector from the data store. In some embodiments, the content review system may review each data store corresponding to a policy on a periodic basis (e.g., every day), in order to ensure that false positives do not remain in the data store for extended periods of time and potentially cause other false positives to be stored in the data store. In other embodiments, a user (e.g., a human agent associated with the online system) may also initiate review of a particular data store corresponding to a particular policy. In some embodiments, a data store may also be reviewed in response to other criteria being satisfied (e.g., the number of semantic vectors stored in the data store reaching a threshold amount).

Figure 8:
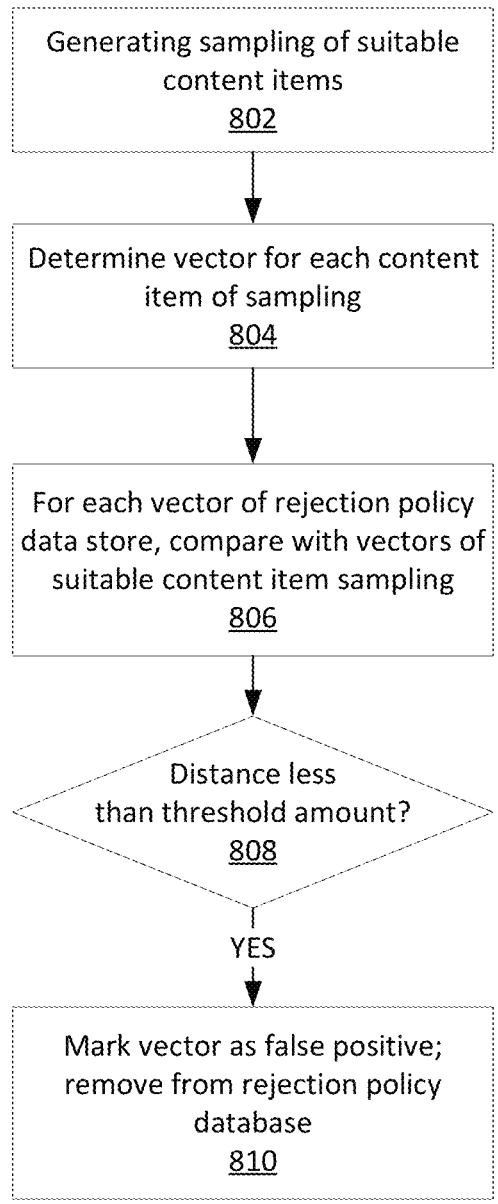
FIG. 8 illustrates a flowchart of a process for reviewing a data store corresponding to a policy, in accordance with some embodiments.

FIG. 8 illustrates a flowchart of a process for reviewing a data store corresponding to a policy, in accordance with some embodiments. The content review system generates 802 a sampling of content items that do not violate any policies of the online system (hereinafter also referred to as "suitable content items"). In some embodiments, the suitable content items are sampled from a suitable content data store (e.g., the acceptable data store 412 illustrated in FIG. 4).

The content review system generates 804 a semantic vector for each of the suitable content items. In some embodiments, the suitable content data store may already store semantic vectors of the suitable content items, and as such the semantic vector may simply be retrieved from the suitable content data store instead of being generated separately.

The content review system identifies 806 the corresponding data store for each of a plurality of policies to be reviewed. For each data store, the content review system compares each of the stored semantic vectors of the data store (corresponding to content items previously determined to likely violate the respective policy) with the semantic vectors of the sampling of suitable content items.

The content review system determines 808 if the determined distance between the semantic vector of the data store and a semantic vector of a suitable content item is below a threshold amount. If so, the content review system determines 810 that the stored semantic vector is a false positive and should be removed from the data store. Else, the content review system determines that the stored semantic vector may not be a false positive, and remains in the data store (not shown). The threshold amount may be different from the first threshold amount used to determine if the semantic vector corresponds to a content item likely to violate the policy (e.g., as described in FIG. 6). For example, the threshold amount used to determine if the semantic vector is a false positive may be less than the threshold amount used to determine if the semantic vector likely violates the policy, such that the content item needs to be semantically closer to a known suitable content item than a previously disallowed content item in order to be considered a false positive and removed from the data store.

In some embodiments, different threshold values may be used to determine different actions to be performed on the stored semantic vector. For example, in some embodiments, the stored semantic vector may be subject to review by an agent (e.g., a human agent or an automatic agent) if the distance between the stored semantic vector and a semantic vector of the sampling of suitable content items is between a first threshold value and a second threshold value.

In some embodiments, it may be possible for a particular semantic vector corresponding to one or more content items to be subject to agent review multiple times. For example, the content review system may receive a request to review a particular semantic vector corresponding to a first content item, for example, from an agent when the first content item is received (e.g., due to having a distance from a data store corresponding to a particular policy that is between a first and second threshold value). The content review system may receive a subsequent request to review the semantic vector again in response to other content items corresponding to the semantic vector being received, or during the review of the data store (e.g., the semantic vector is stored in the data store, and is compared to the sampling of suitable semantic vectors). In some embodiments where a particular semantic vector has been subject to agent review multiple times, the content review system may determine that the semantic vector is suitable or violating a policy based upon a result of a majority of agent reviews (e.g., a majority vote).

By periodically reviewing the stored semantic vectors associated with each policy against the semantic vectors of suitable content items, the content review system removes semantic vectors of false positive content items from the policy data stores, potentially improving the accuracy of reviews of subsequent content items.

Content Review Using Templates

As discussed above, in many cases an online system may receive multiple similar content items. For example, the online system may receive content items that are variations of each other, with only minor, non-substantive differences between them (e.g., different resolutions, different levels of cropping, different banner text or colors, and/or the like). As such, if one of the content items violates a particular policy, it may be highly likely that the remaining content items will violate the same policy.

In some embodiments, the online system uses semantic vector templates to group different content items that are semantically similar. For example, multiple content items may contain similar embedded semantic features, with only small differences between them. The online system identifies a semantic vector template corresponding to the multiple content items that indicates common semantic features between the content items.

FIG. 9 illustrates an example of a semantic vector template in accordance with some embodiments. As illustrated in FIG. 9, a first content item 902 may comprise an image of a sweatshirt, while a second content item 904 may comprise an image depicting a similar sweatshirt. The first and second content items 902 and 904 may be represented by the first and second binary vectors 906 and 908, respectively The first and second content items 902 and 904 are substantially similar except for a portion of text printed on the sweatshirt. As such, the first and second binary vectors 906 and 908 may be substantially similar, and contain common portions 910 corresponding to semantic features that are shared by both content items.

The online system uses the common portions 910 of the binary vectors corresponding to the content items to generate a semantic vector template 912. The semantic vector template 912 comprises one or more sets of bits 914 that are shared by all content items that conform to the template (e.g., first and second content items 902 and 904) and one or more sets of bits 916 that may be different in the content items that conform to the template. The shared bits 914 may be based upon the determined common portions 910.

The image 918 illustrates the semantic features that the online system may include in the semantic vector template 912. For example, the semantic features of the semantic vector template 912 that are expressed by the image 918 may include the sweatshirt and the common text between the different content items that conform to the template.

Although FIG. 9 shows the semantic vector template 912 illustrated with a particular image 918, it is understood that a semantic vector template may not be able to be obtained explicitly from a particular image or group of images. For example, various challenges such as object detection and recognition, image segmentation, and/or the like may prevent the construction of templates that effectively capture common semantic features of the content items. Instead, the templates are derived from the extracted semantic features of the content items represented as hidden embeddings extracted from neural networks processing the content items. As used herein, "explicit" embeddings may refer to embedding features that can be extracted from real images corresponding to content items, while "hidden" embeddings may refer to embedding features corresponding to image templates associated with content items that may not necessarily be able to be extracted from real images. For example, a hidden embedding may correspond to a portion to a template that includes some of the shared portion of the template and some of the wildcard portion of the template.

Figure 10:
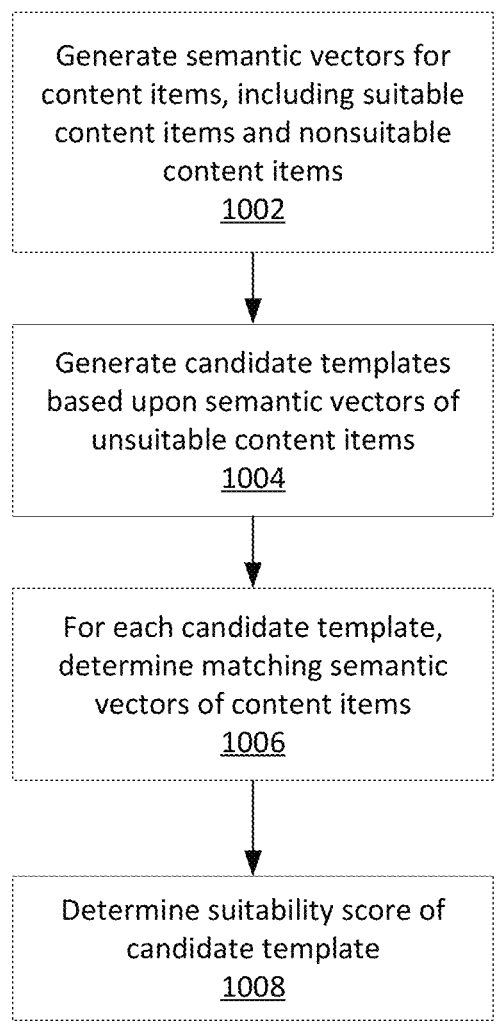
FIG. 10 illustrates a flowchart of illustrating the construction of semantic vector templates for content items, in accordance with some embodiments.

FIG. 10 illustrates a flowchart illustrating the construction of semantic vector templates for content items, in accordance with some embodiments. The content review system constructs the templates based upon historically received content items, which include both content items that are suitable (e.g., content items that do not violate any policies, and thus can be displayed to users of the online system) and content items that are unsuitable (e.g., content items determined to violate at least one policy, and are thus not suitable for display to users). Each unsuitable content item may also be associated with a particular policy that the content item violated. By analyzing the historically received content items and whether they are suitable or unsuitable, semantic vector templates may be constructed that are able to correspond to multiple different content items and serve as a strong indication of whether a content item that conforms with the template is suitable or unsuitable.

The content review system generates 1002 semantic vectors of each of a plurality of historically received content items, which include both suitable and unsuitable content items. Each semantic vector may indicate one or more semantic features of the corresponding content item, and may be represented as a binary vector. In some embodiments, the unsuitable content items are content items that have been determined to be unsuitable through human review.

The content review system generates 1004 a plurality of candidate templates based upon the semantic vectors of the unsuitable content items. For example, each candidate template may correspond to a subset of a semantic vector (e.g., a binary vector) that is shared by two or more unsuitable content items. In some embodiments, the two or more unsuitable content items may need to have been deemed unsuitable based upon the same policy.

Each candidate template comprises a first portion that is shared by all content items associated with the candidate template (referred to as the "shared portion"), and a second portion that may vary between the content items associated with the candidate template (referred to as the "wildcard portion"). The size of the shared portion may be required to be a certain size relative to the wildcard portion of the template. For example, in an embodiment where the semantic vector of each content item corresponds to a binary vector having a certain bit length, the shared portion of a template may be required to contain a threshold number of bits (e.g., 80% of the bit length or above), while the bit length of the wildcard portion may be limited (e.g., 20% of the bit length or below). As such, the distance between the semantic vectors of any two content items associated with a particular template will be limited by the size of the wildcard portion of the template. It is understood that the shared portion and wildcard portion of the template may each correspond to a plurality of non-adjacent sequences of bits within a semantic vector. For example, as illustrated in FIG. 9, the shared portion 914 of the template 912 comprises two sequences of bits separated by one or more bits of the wildcard portion 916.

In some embodiments, machine learning techniques are used to generate the one or more candidate templates. For example, the candidate templates may be a set of templates that maximizes a difference between unsuitable content items matching the template and suitable content items matching the template.

In some embodiments, machine learning is used to reduce a search space for identifying candidate templates. For example, the language processing system may identify pairs of unsuitable content items having semantic vectors that are within a particular distance from each other (e.g., a Hamming distance), and generate candidate templates based upon shared portions of the semantic vectors. In some embodiments, machine learning is used to reduce the search space for identifying candidate templates by prioritizing creating candidate templates from content items having certain semantic features, certain combinations of semantic features, and/or lack of certain semantic features. For example, the language processing system may, based upon historical content items determined to be suitable or non-suitable, may be trained to recognize certain semantic features as being more strongly indicative that a content item is unsuitable. As such, the language processing system may prioritize analysis of content items containing those semantic features when constructing candidate templates.

The content review system identifies 1006, for each candidate template, all content items of the plurality of historically received content items that conform to the template. A set of content items that conform to the same template may be referred to as a "cluster." In some embodiments, a particular content item may be part of two or more clusters.

The content review system determines 1008 a suitability of the template based upon the cluster of content items associated with the template. In some embodiments, the suitability of the content items of the cluster is analyzed to determine a suitability score of the template, which indicates a probability that a newly received content item that conforms to the template will be suitable. In some embodiments, the suitability score for a template is calculated based upon a ratio of the number of the content items in the cluster that are unsuitable and a total number of content items in the cluster. In addition, the number of unsuitable content items in the cluster associated with the template may be used to indicate a confidence value of the suitability score.

In some embodiments, a number of suitable content items not part of the cluster associated with the template (e.g., number of suitable content items that do not match the template) is used to determine whether the template is too "generic." For example, if the number of suitable content items determined to be not part of the cluster does not meet a threshold amount, the template may be considered to be too generic and will be rejected, i.e., not be used for analyzing received content items.

For example, for a particular template associated with a cluster of ten content items, if all ten of the content items of the cluster have been determined to be unsuitable based upon a first policy, then additional received content items that match the template are also likely to be unsuitable under the first policy. As such, the particular template may have a low suitability score.

In some embodiments, different content items within a cluster corresponding to a particular template may violate different policies. The suitability score for the template may be calculated based upon the unsuitable content items within the cluster determined to be unsuitable under the policy having the most unsuitable content items in the cluster. In other embodiments, the suitability score for the template is calculated based upon all unsuitable content items within the cluster. In some embodiments, separate suitability scores may be calculated for each policy.

In some embodiments, only templates with a suitability score below a threshold value (indicating that content items that match the template are likely to violate a policy) are stored and used for comparison against received content items. In other embodiments, only templates with a suitability score below a first threshold value or above a second threshold value higher than the first threshold value are stored. Each stored template may be either a "bad" template (having a suitability score below the first threshold value) wherein conforming content items are likely to be unsuitable, or a "good" template (having a suitability score above the second threshold value) wherein conforming content items are likely to be suitable. In some embodiments, only "bad" templates are stored and used for comparison against received content items. As such, each stored template will correspond to multiple content items and will provide a strong indication of whether a conforming content item is suitable or unsuitable. In addition, in some embodiments, only templates having a confidence value above a threshold amount are stored and used for comparison against received content items.

In some embodiments, machine learning may be used to determine or adjust the suitability scores of one or more templates. For example, in some embodiments, a set of content items is compared against one or more stored templates in order to assess whether the content items are suitable or unsuitable. The results of the assessment can be compared to actual data indicating the suitability of the set of content items (e.g., obtain through review by human agents) and used to adjust the suitability scores of the one or more templates.

Figure 11:
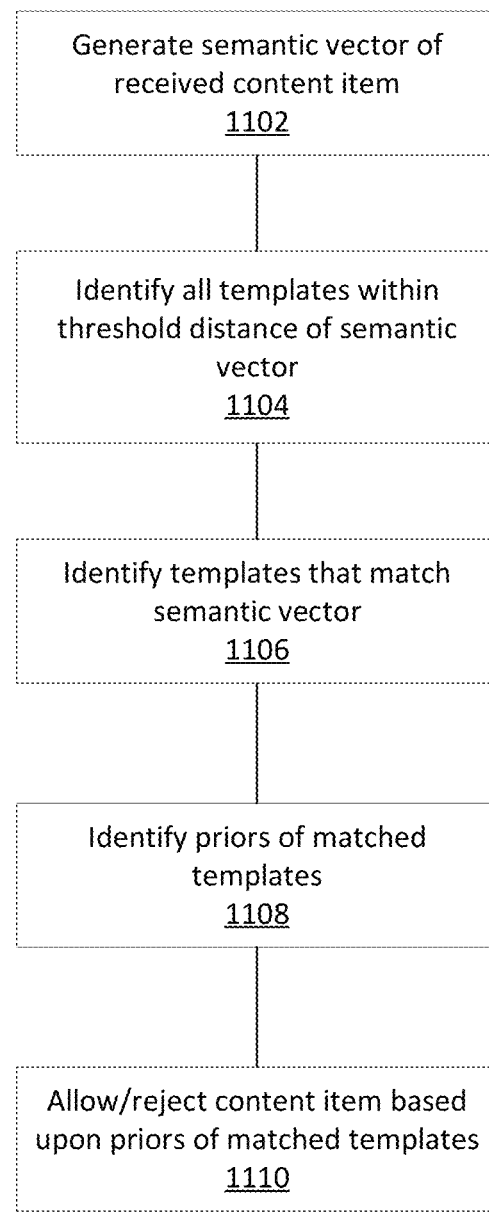
FIG. 11 illustrates a flowchart of a process for using templates to review received content items, in accordance with some embodiments.

FIG. 11 illustrates a flowchart of a process for using templates to review received content items, in accordance with some embodiments The content review system receives 1102 a content item to be reviewed, and generates a semantic vector of the received content item. The generated semantic vector may be a binary vector corresponding to a hash representation of the content item.

The content review system identifies 1104 a set of templates within a threshold distance of the semantic vector of the content item. A distance between a semantic vector and a template may be computed as a distance between the shared portion of the template and the corresponding portion of the semantic vector. The content review system identifies 1106 all templates of the identified set of templates that match the semantic vector of the received content item. The semantic vector is considered to match a template if the semantic vector exactly matches the non-wildcard portion of the template (e.g., the distance between the semantic vector and the template is 0).

In some embodiments, it is computationally less expensive to determine if a template is within a threshold distance from a semantic vector than to determine if the template matches the semantic vector. As such, the content review system may first filter the stored templates to identify the set of templates within a threshold distance of the semantic vector before identifying one or more templates of the set that match the semantic vector.

The content review system identifies 1108 a measure of suitability of the matched templates. As discussed above, the suitability of a given template is based upon a proportion of the content items that conform to the template that are unsuitable. In some embodiments, the suitability of a template indicates a probability that a content item that matches the template will be unsuitable under one or more policies.

The content review system reviews 1110 the content item based upon the identified suitability of the matched templates. For example, if the suitability of the template does not exceed a first threshold amount, the content item may be automatically determined to be unsuitable. In some embodiments, if the suitability of the template is higher than the first threshold amount but lower than a second threshold amount, the content item is subject to review by a human agent, who will determine whether the content item is suitable or unsuitable. On the other hand, if the suitability of the template is higher than the second threshold amount, the content item is determined to be suitable.

In some embodiments, the content item is associated with any matching templates, and may be used to update the suitability score of the matching templates. In some embodiments, the content item only is only used to update the suitability score of the matching template if the content item was subject to human review to confirm the suitability of the content item.

In some embodiments, the content item may match multiple different templates associated with different suitability scores. The suitability of the content item may be determined based upon an aggregation of the suitability scores of the different templates. In some embodiments, the suitability of the content item is determined based upon a suitability score of a particular matching template, such as the matching template with the smallest wildcard portion, the highest confidence value, and/or the like. In some embodiments, the suitability of the content item is determined based upon a highest suitability score or a lowest suitability score of the multiple templates matching the content item.

In some embodiments, if the semantic vector of the content item does not match any templates, then the content item is submitted for agent review. For example, in some embodiments, both "good" and "bad" templates are stored. As such, the stored templates may comprise only templates having suitability scores below the first threshold value (e.g., bad templates) or above the second threshold value (e.g., good templates), resulting in all content items with semantic vectors that do not match any templates being subject to review by a human agent. In some embodiments where only "bad" templates are stored, a content item that does not match any of the stored templates may be automatically considered suitable.

By generating templates that match multiple content items and provide a strong indication of suitability, the suitability of newly received content items can be easily assessed if they match with any of the generated templates. In addition, the use of templates to assess the suitability of content items may allow for greater precision in assessing the content item based upon what semantic features it contains. For example, while two content items having semantic vectors that are a certain distance from each other may contain many different types or variations of semantic features, content items that conform to a particular template will be known to contain the same semantic features that are associated with the template.

Alternative Embodiments

The foregoing description of the embodiments of the invention has been presented for the purpose of illustration; it is not intended to be exhaustive or to limit the invention to the precise forms disclosed Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer Such a computer program may be stored in a non-transitory, tangible computer readable storage medium, or any type of media suitable for storing electronic instructions, which may be coupled to a computer system bus Furthermore, any computing systems referred to in the specification may include a single processor or may be architectures employing multiple processor designs for increased computing capability.

Embodiments of the invention may also relate to a product that is produced by a computing process described herein Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
   receiving, by an online system associated with a plurality of policies, a request to determine whether an input content item violates any of the plurality of policies, each policy indicating a type of content item considered suitable or unsuitable for presenting to users of the online system;
   accessing one or more data stores storing, for each of the plurality of policies, a respective set of semantic vectors corresponding to content items previously determined to violate the policy;
   determining a semantic vector of the input content item, by:
     receiving the input content item as input at a deep neural network having a plurality of layers;
     determining the semantic vector representing the input content item based on the output of a hidden layer of the deep neural network;
   determining a plurality of distance metric values, each corresponding to a distance between the semantic vector of the input content item and one or more semantic vectors of the set of semantic vectors corresponding to a respective policy of the plurality of policies; and
   responsive to determining that a distance metric value of the plurality of distance metric values associated with a particular policy of the plurality of policies is below a first threshold value indicating a distance at which a likelihood that the input content item violates the particular policy is at least a first threshold probability, automatically withholding the content item from users of the online system.

2. The method of claim 1, wherein the semantic vector representing the input content item is obtained by applying a hash function to the output of the hidden layer of the neural network.

3. The method of claim 1, wherein the neural network is configured to output one or more scores indicating a probability that the input content item contains one or more corresponding semantic features.

4. The method of claim 1, further comprising:
   receiving a request to determine whether a second input content item violates any of the plurality of policies;
   determining a second plurality of distance metric values, each corresponding to a distance between a semantic vector of the second input content item and one or more semantic vectors of the set of semantic vectors corresponding to a respective policy of the plurality of policies;
   determining that a distance metric value of the second plurality distance metric values associated with the particular policy is above a second threshold value, determining that the second input content item does not violate the particular policy; and
   responsive to determining that the second content item does not violate any of the policies of the plurality of policies, sending the second content item to the users of the online system.

5. The method of claim 4, wherein the second threshold value is greater than the first threshold value, and indicates a distance at which a likelihood that the second input content item violates the particular is at least a second threshold probability that is lower than the first threshold probability.

6. The method of claim 1, further comprising:
   responsive to determining that the distance metric value is above the first threshold value but below a second threshold value, flagging the content item for review.

7. The method of claim 1, further comprising:
   responsive to determining that the distance metric value is below the first threshold value, storing the semantic vector of the input content item as part of the set of semantic vectors.

8. The method of claim 1, wherein the semantic vector corresponds to a binary hash value, and wherein the distance metric value corresponds to a hamming distance.

9. A method comprising:
   receiving, by an online system associated with a plurality of policies, a request to determine whether an input content item violates any of the plurality of policies, each policy indicating a type of content item considered suitable or unsuitable for presenting to users of the online system;

accessing one or more data stores storing, for each of the plurality of policies, a respective set of semantic vectors corresponding to content items previously determined to violate the policy;

determining a semantic vector of the input content item using a deep neural network having a plurality of layers;

determining a plurality of distance metric values, each corresponding to a distance between the semantic vector of the input content item and one or more semantic vectors of the set of semantic vectors corresponding to a respective policy of the plurality of policies; and responsive to determining that a distance metric value of the plurality of distance metric values associated with a particular policy of the plurality of policies is below a first threshold value indicating a distance at which a likelihood that the input content item violates the particular policy is at least a first threshold probability, automatically withholding the content item from users of the online system.

10. The method of claim 9, further comprising:
receiving a request to determine whether a second input content item violates any of the plurality of policies;

determining a second plurality of distance metric values, each corresponding to a distance between a semantic vector of the second input content item and one or more semantic vectors of the set of semantic vectors corresponding to a respective policy of the plurality of policies;

determining that a distance metric value of the second plurality distance metric values associated with the particular policy is above a second threshold value, determining that the second input content item does not violate the particular policy; and responsive to determining that the second content item does not violate any of the policies of the plurality of policies, sending the second content item to the users of the online system.

11. The method of claim 9, further comprising:
responsive to determining that the distance metric value is above the first threshold value but below a second threshold value, flagging the content item for review.

12. The method of claim 9, further comprising:
responsive to determining that the distance metric value is below the first threshold value, storing the semantic vector of the input content item as part of the set of semantic vectors.

13. The method of claim 9, wherein the semantic vector corresponds to an embedding associated with the input content item obtained using the deep neural network.

14. The method of claim 9, wherein the semantic vector corresponds to a binary hash value, and wherein the distance metric value corresponds to a hamming distance.

15. The method of claim 9, wherein the input content item comprises an image.

16. A computer readable non-transitory storage medium, storing instructions for:
receiving, by an online system associated with a plurality of policies, a request to determine whether an input content item violates any of the plurality of policies, each policy indicating a type of content item considered suitable or unsuitable for presenting to users of the online system;

accessing one or more data stores storing, for each of the plurality of policies, a respective set of semantic vectors corresponding to content items previously determined to violate the policy;

determining a semantic vector of the input content item using a deep neural network having a plurality of layers;

determining a plurality of distance metric values, each corresponding to a distance between the semantic vector of the input content item and one or more semantic vectors of the set of semantic vectors corresponding to a respective policy of the plurality of policies; and responsive to determining that a distance metric value of the plurality of distance metric values associated with a particular policy of the plurality of policies is below a first threshold value indicating a distance at which a likelihood that the input content item violates the particular policy is at least a first threshold probability, automatically withholding the content item from users of the online system.

17. The computer readable non-transitory storage medium of claim 16, wherein the stored instructions further comprise instructions for:
responsive to determining that a distance metric value of the plurality distance metric values associated with the particular policy is above a second threshold value, determining that the input content item does not violate the particular policy; and responsive to determining that the content item does not violate any of the policies of the plurality of policies, sending the content item to the users of the online system.

18. The computer readable non-transitory storage medium of claim 17, wherein the second threshold value is greater than the first threshold value, and indicates a distance at which a likelihood that the second input content item violates the particular is at least a second threshold probability that is lower than the first threshold probability.

19. The computer readable non-transitory storage medium of claim 16, wherein the stored instructions further comprise instructions for:
responsive to determining that the distance metric value is above the first threshold value but below a second threshold value, flagging the content item for review.

20. The computer readable non-transitory storage medium of claim 16, wherein the stored instructions further comprise instructions for:
responsive to determining that the distance metric value is below the first threshold value, storing the semantic vector of the input content item as part of the set of semantic vectors.

21. The computer readable non-transitory storage medium of claim 16, wherein the semantic vector corresponds to an embedding associated with the input content item obtained using the deep neural network.

22. The computer readable non-transitory storage medium of claim 16, wherein the semantic vector corresponds to a binary hash value, and wherein the distance metric value corresponds to a hamming distance.

* * * * *